(12) United States Patent
Jiang et al.

(10) Patent No.: US 11,172,444 B2
(45) Date of Patent: Nov. 9, 2021

(54) TECHNIQUES FOR POWER CONTROL AND MANAGEMENT

(71) Applicant: QUALCOMM Incorporated, San Diego, CA (US)

(72) Inventors: Jing Jiang, San Diego, CA (US);
Wanshi Chen, San Diego, CA (US);
Peter Gaal, San Diego, CA (US);
Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 15/711,297

(22) Filed: Sep. 21, 2017

(65) Prior Publication Data
US 2018/0103428 A1    Apr. 12, 2018

Related U.S. Application Data

(60) Provisional application No. 62/406,224, filed on Oct. 10, 2016.

(51) Int. Cl.
*H04W 52/02* (2009.01)
*H04W 52/34* (2009.01)
(Continued)

(52) U.S. Cl.
CPC ..... *H04W 52/0225* (2013.01); *H04W 52/346* (2013.01); *H04W 72/042* (2013.01);
(Continued)

(58) Field of Classification Search
None
See application file for complete search history.

(56) References Cited

U.S. PATENT DOCUMENTS 7,236,747 B1 * 6/2007 Meacham .......... H04B 1/71632
370/208
9,019,924 B2 * 4/2015 Ng ..................... H04W 72/042
370/329
(Continued)

FOREIGN PATENT DOCUMENTS

CN    102377443 A    3/2012
CN    104871606 A    8/2015
(Continued)

OTHER PUBLICATIONS

U.S. Appl. No. 62/383,649, "Low Latency Transmissions from a User Equipment", Papasakellariou, filed Sep. 6, 2016, p. 12-18, Fig. 5-7.*
(Continued)

*Primary Examiner* — Gregory B Sefcheck
(74) *Attorney, Agent, or Firm* — Patterson + Sheridan, LLP

(57) ABSTRACT

Aspects of the present disclosure relate to wireless communications and, more particularly, to power control and management for enhanced mobile broadband (eMBB)/ultra-reliable low latency (URLLC) multiplexing. A method for wireless communications that may be performed by a user equipment (UE) is provided. The method generally includes receiving, from a base station (BS), scheduling information scheduling the first UE for communication, with the BS, according to a first communications service type, receiving signaling indicating a second UE is scheduled for communication with the BS according to a second communications service type, and communicating with the BS according to the first communications service type at a reduced transmission power relative to a transmission power used for communicating according to the second communications service type.

20 Claims, 9 Drawing Sheets

(51) Int. Cl.
  *H04W 76/27* (2018.01)
  *H04W 72/04* (2009.01)
  *H04W 72/12* (2009.01)
  *H04W 52/14* (2009.01)
  *H04W 24/02* (2009.01)

(52) U.S. Cl.
  CPC ....... *H04W 72/1289* (2013.01); *H04W 76/27* (2018.02); *H04W 24/02* (2013.01); *H04W 52/0206* (2013.01); *H04W 52/146* (2013.01); *Y02D 30/70* (2020.08)

(56) References Cited

U.S. PATENT DOCUMENTS

| | | | | |
|---|---|---|---|---|
| 9,154,250 | B2* | 10/2015 | Manssour | H04W 88/04 |
| 9,270,356 | B2* | 2/2016 | Chung | H04L 5/0048 |
| 9,306,651 | B2* | 4/2016 | Chung | H04B 7/0693 |
| 9,379,439 | B2* | 6/2016 | Turpin | H04W 16/28 |
| 9,537,553 | B2* | 1/2017 | Rong | H04W 52/367 |
| 9,838,175 | B2* | 12/2017 | Kim | H04W 52/243 |
| 9,942,852 | B2* | 4/2018 | Hsu | H04W 52/0258 |
| 9,985,808 | B2* | 5/2018 | Mukkavilli | H04L 5/14 |
| 10,367,620 | B2* | 7/2019 | Iyer | H04L 5/005 |
| 10,524,244 | B2* | 12/2019 | Tsai | H04W 72/042 |
| 10,575,322 | B2* | 2/2020 | Lee | H04W 72/1268 |
| 10,735,980 | B2* | 8/2020 | Xu | H04B 7/0417 |
| 10,804,952 | B2* | 10/2020 | Pratt | H04B 7/0626 |
| 10,887,064 | B2* | 1/2021 | Chung | H04B 7/0693 |
| 10,887,834 | B2* | 1/2021 | Ryoo | H04W 52/0209 |
| 10,917,786 | B2* | 2/2021 | Ryoo | H04W 52/0229 |
| 11,064,374 | B2* | 7/2021 | Xu | H04B 7/0408 |
| 2008/0233945 | A1 | 9/2008 | Gummadi et al. | |
| 2017/0142591 | A1* | 5/2017 | Vrzic | H04W 24/08 |
| 2017/0201943 | A1* | 7/2017 | Hsu | H04W 52/0225 |
| 2017/0231011 | A1* | 8/2017 | Park | H04W 16/14 |
| 2017/0245140 | A1* | 8/2017 | Au | H04W 8/22 |
| 2017/0251518 | A1* | 8/2017 | Agiwal | H04W 24/08 |
| 2017/0288817 | A1* | 10/2017 | Cao | H04L 1/1812 |
| 2017/0339648 | A1* | 11/2017 | Wang | H04W 52/06 |
| 2017/0367036 | A1* | 12/2017 | Chen | H04W 76/10 |
| 2017/0367110 | A1* | 12/2017 | Li | H04L 5/0007 |
| 2017/0367116 | A1* | 12/2017 | Li | H04W 56/0045 |
| 2018/0020487 | A1* | 1/2018 | Tsai | H04W 72/0446 |
| 2018/0027358 | A1* | 1/2018 | Ge | H04W 4/70 370/329 |
| 2018/0035416 | A1* | 2/2018 | Yi | H04L 5/0037 |
| 2018/0035459 | A1* | 2/2018 | Islam | H04L 1/16 |
| 2018/0048418 | A1* | 2/2018 | Ge | H04L 1/0038 |
| 2018/0049015 | A1* | 2/2018 | Gupta | H04W 16/10 |
| 2018/0069685 | A1* | 3/2018 | Yang | H04L 5/14 |
| 2018/0070242 | A1* | 3/2018 | Damnjanovic | H04W 76/11 |
| 2018/0070369 | A1* | 3/2018 | Papasakellariou | H04B 7/024 |
| 2018/0084593 | A1* | 3/2018 | Chen | H04W 76/11 |
| 2018/0098312 | A1* | 4/2018 | Lin | H04L 1/1861 |
| 2018/0176801 | A1* | 6/2018 | Rune | H04B 7/0695 |
| 2018/0205436 | A1* | 7/2018 | Gil | H04B 7/0617 |
| 2018/0242304 | A1* | 8/2018 | Rong | H04W 28/0247 |
| 2018/0269920 | A1* | 9/2018 | Le Naour | H04B 1/406 |

FOREIGN PATENT DOCUMENTS

| | | |
|---|---|---|
| EP | 3116185 A1 | 1/2017 |
| WO | 2015133766 A1 | 9/2015 |

OTHER PUBLICATIONS

U.S. Appl. No. 62/372,872, "Methods and Systems for Blind Detection with Polar Code", Ge et al., filed Aug. 10, 2016, paragraph 3.*

U.S. Appl. No. 62/373,434, filed Aug. 11, 2016, Lee et al., "Efficient Uplink Parameter Configuration and Semi-Persistent Scheduling Operation in New RAT System", p. 3-4.*

U.S. Appl. No. 62/370,698, filed Aug. 3, 2016, Lee et al., "Efficient Uplink Parameter Configuration and Semi-Persistent Scheduling Operation in New RAT System", p. 3-4.*

U.S. Appl. No. 62/320,658, "Cosite Transmission for Analog RF Isolation", Pratt et al., dated Apr. 11, 2016.*

International Search Report and Written Opinion—PCT/US2017/052983—ISA/EPO—dated Nov. 16, 2017.

SAMSUNG: "Evaluation Results of Superposition Scheme in Case of Multiplexing eMBB and URLLC", 3GPP Draft; R1-1609058, 3rd Generation Partnership Project (3GPP), Mobile Competence Centre, 650, Route Des Lucioles, F-06921 Sophia-Antipolis Cedex, France, vol. Ran WG1. No. Lisbon. Portugal; Oct. 9, 2016, XP051149109, Retrieved from the Internet: URL:http://www.3gpp.org/ftp/Meetings_3GPP_SYNC/RAN1/Docs/ [retrieved on Oct. 9, 2016], 5 pages.

* cited by examiner

TECHNIQUES FOR POWER CONTROL AND MANAGEMENT

CLAIM OF PRIORITY UNDER 35 U.S.C. § 119

This application claims benefit of U.S. Provisional Patent Application Ser. No. 62/406,224, filed Oct. 10, 2016, which is herein incorporated by reference in its entirety.

FIELD OF THE DISCLOSURE

Aspects of the present disclosure generally relate to wireless communication and, more particularly, to techniques for power control and management for enhanced mobile broadband (eMBB)-ultra reliable low latency communication (URLLC) multiplexing.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to power control and management for enhanced mobile broadband (eMBB)-ultra reliable low latency communication (URLLC) multiplexing.

Certain aspects of the present disclosure provide a method for wireless communications by a base station (BS). The method generally includes scheduling a first user equipment (UE) for communication with the BS according to a first communications service type, scheduling a second UE for communication with the BS according to a second communications service type, and communicating with the first UE according to the first communications service type at a reduced transmission power relative to a transmission power used for communicating with the second UE according to the second communications service type.

Certain aspects of the present disclosure provide an apparatus for wireless communications by a base station (BS). The apparatus generally includes at least one processor configured to schedule a first user equipment (UE) for communication with the BS according to a first communications service type, schedule a second UE for communication with the BS according to a second communications service type, and communicate with the first UE according to the first communications service type at a reduced transmission power relative to a transmission power used for communicating with the second UE according to the second communications service type. The apparatus also generally includes a memory coupled with the at least one processor.

Certain aspects of the present disclosure provide an apparatus for wireless communications by a base station (BS). The apparatus generally includes means for scheduling a first user equipment (UE) for communication with the BS according to a first communications service type, means for scheduling a second UE for communication with the BS according to a second communications service type, and means for communicating with the first UE according to the first communications service type at a reduced transmission power relative to a transmission power used for communicating with the second UE according to the second communications service type.

Certain aspects of the present disclosure provide a non-transitory computer-readable medium for wireless communications by a base station (BS). The computer-readable medium generally includes instructions for scheduling a first user equipment (UE) for communication with the BS according to a first communications service type, scheduling a second UE for communication with the BS according to a second communications service type, and communicating with the first UE according to the first communications service type at a reduced transmission power relative to a transmission power used for communicating with the second UE according to the second communications service type.

Certain aspects of the present disclosure provide a method for wireless communications by a user equipment (UE). The method generally includes receiving, from a base station (BS), scheduling information scheduling the first UE for communication, with the BS, according to a first communications service type, receiving signaling indicating a second UE is scheduled for communication with the BS according to a second communications service type, and communicating with the BS according to the first communications service type at a reduced transmission power relative to a transmission power used for communicating according to the second communications service type.

Certain aspects of the present disclosure provide an apparatus for wireless communications by a user equipment (UE). The apparatus generally includes at least one processor configured to receive, from a base station (BS), scheduling information scheduling the first UE for communication, with the BS, according to a first communications service type, receive signaling indicating a second UE is scheduled for communication with the BS according to a second communications service type, and communicate with the BS according to the first communications service type at a reduced transmission power relative to a transmission power used for communicating according to the second communications service type. The apparatus also generally includes a memory coupled with the at least one processor.

Certain aspects of the present disclosure provide an apparatus for wireless communications by a user equipment (UE). The apparatus generally includes means for receiving, from a base station (BS), scheduling information scheduling the first UE for communication, with the BS, according to a first communications service type, means for receiving signaling indicating a second UE is scheduled for communication with the BS according to a second communications service type, and means for communicating with the BS according to the first communications service type at a reduced transmission power relative to a transmission power used for communicating according to the second communications service type.

Certain aspects of the present disclosure provide a non-transitory computer-readable medium for wireless communications by a user equipment (UE). The non-transitory computer-readable medium generally includes instructions for receiving, from a base station (BS), scheduling information scheduling the first UE for communication, with the BS, according to a first communications service type, receiving signaling indicating a second UE is scheduled for communication with the BS according to a second communications service type, and communicating with the BS according to the first communications service type at a reduced transmission power relative to a transmission power used for communicating according to the second communications service type Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
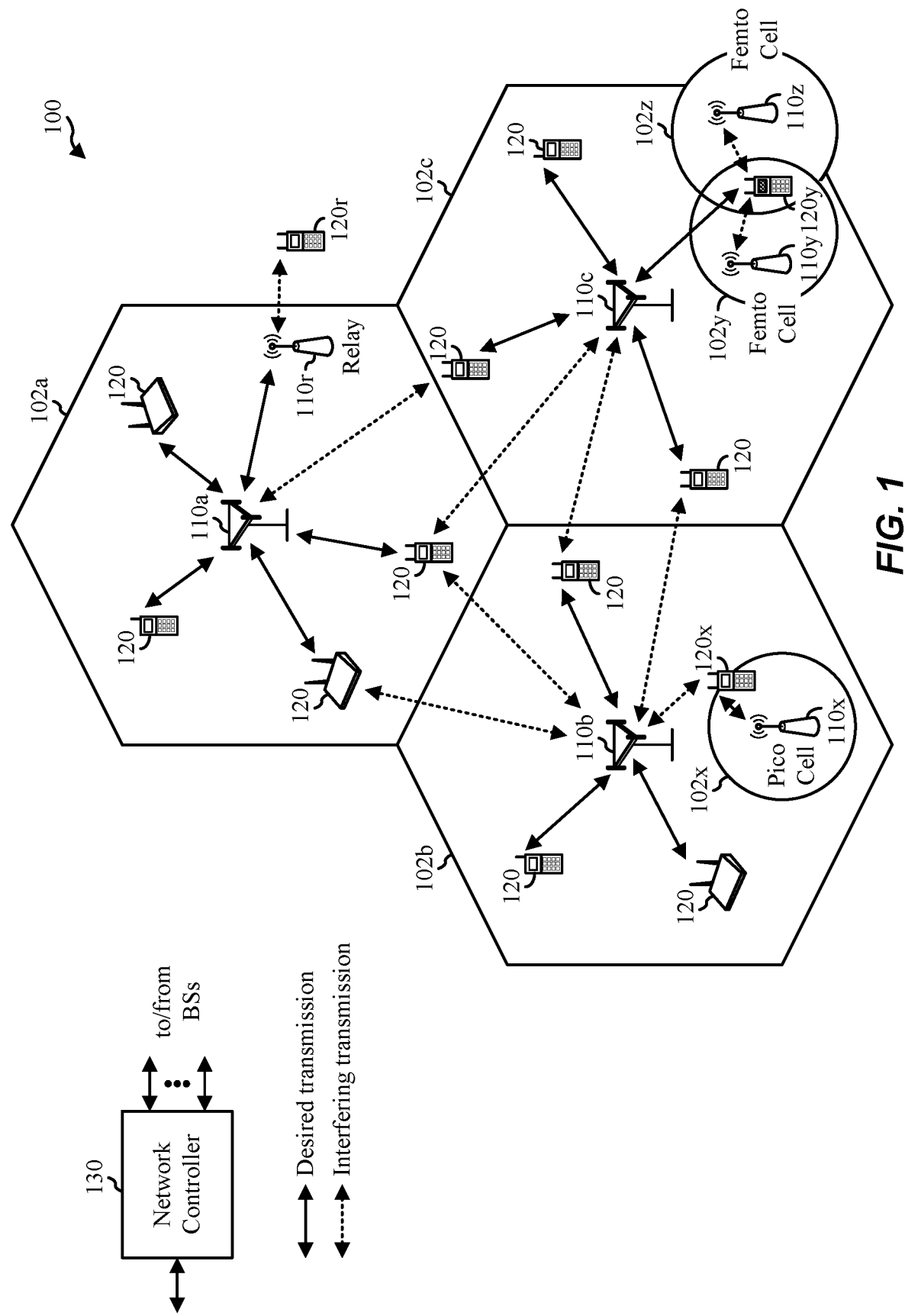
FIG. 1 is a block diagram conceptually illustrating an example telecommunications system, in accordance with certain aspects of the present disclosure.

Aspects of the present disclosure provide apparatus, methods, processing systems, and computer program products for new radio (NR) (new radio access technology or 5G technology).

5G may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

As described herein, eMBB communication services and URLLC communication services are scheduled at different transmission time intervals (TTIs) but are multiplexed in the same time-frequency resource to achieve efficient resource utilization. In some cases, URLLC traffic may take priority over eMBB traffic. Thus, when eMBB traffic and URLLC traffic are scheduled at the same time, eMBB traffic may be "punctured"/preempted by the URLLC traffic, which may result in wasted resources. Thus, aspects of the present disclosure introduce a concept of power sharing between eMBB traffic and URLLC traffic which may help alleviate this issue of wasted resources. For example, instead of fully puncturing eMBB resources, a power backoff value may be used to reduce the transmission power of the eMBB traffic. This extra transmission power not being used by eMBB may then be applied to URLLC traffic, for example, as described in greater detail below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

EXAMPLE WIRELESS COMMUNICATIONS SYSTEM

FIG. 1 illustrates an example wireless network 100, such as a new radio (NR) or 5G network, in which aspects of the present disclosure may be performed. For example, techniques presented herein may be used to reduce the wasting of resources when enhanced mobile broadband (eMBB) traffic and ultra reliable low latency communications (URLLC) traffic are concurrently scheduled.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
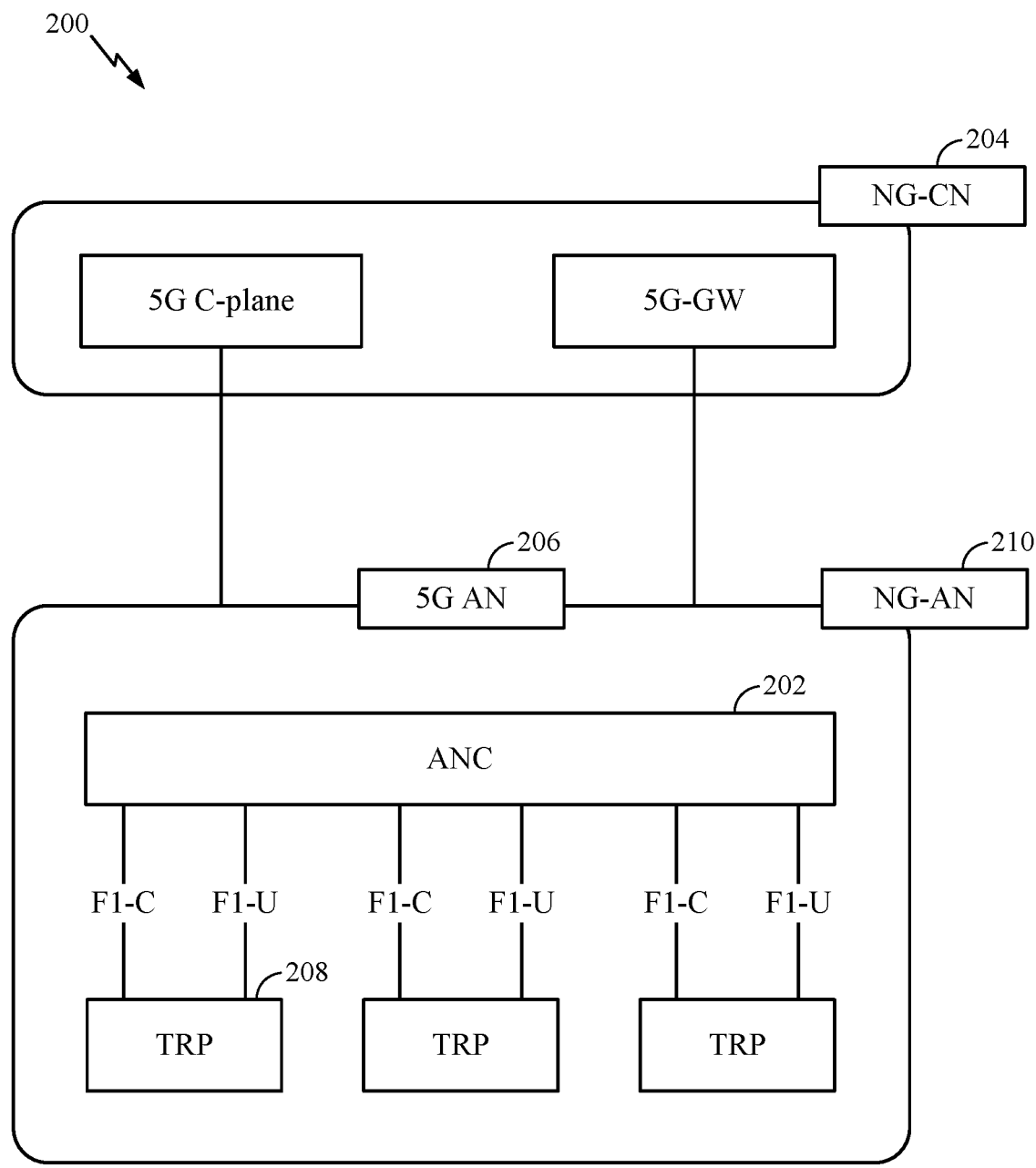
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture of the distributed RAN 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
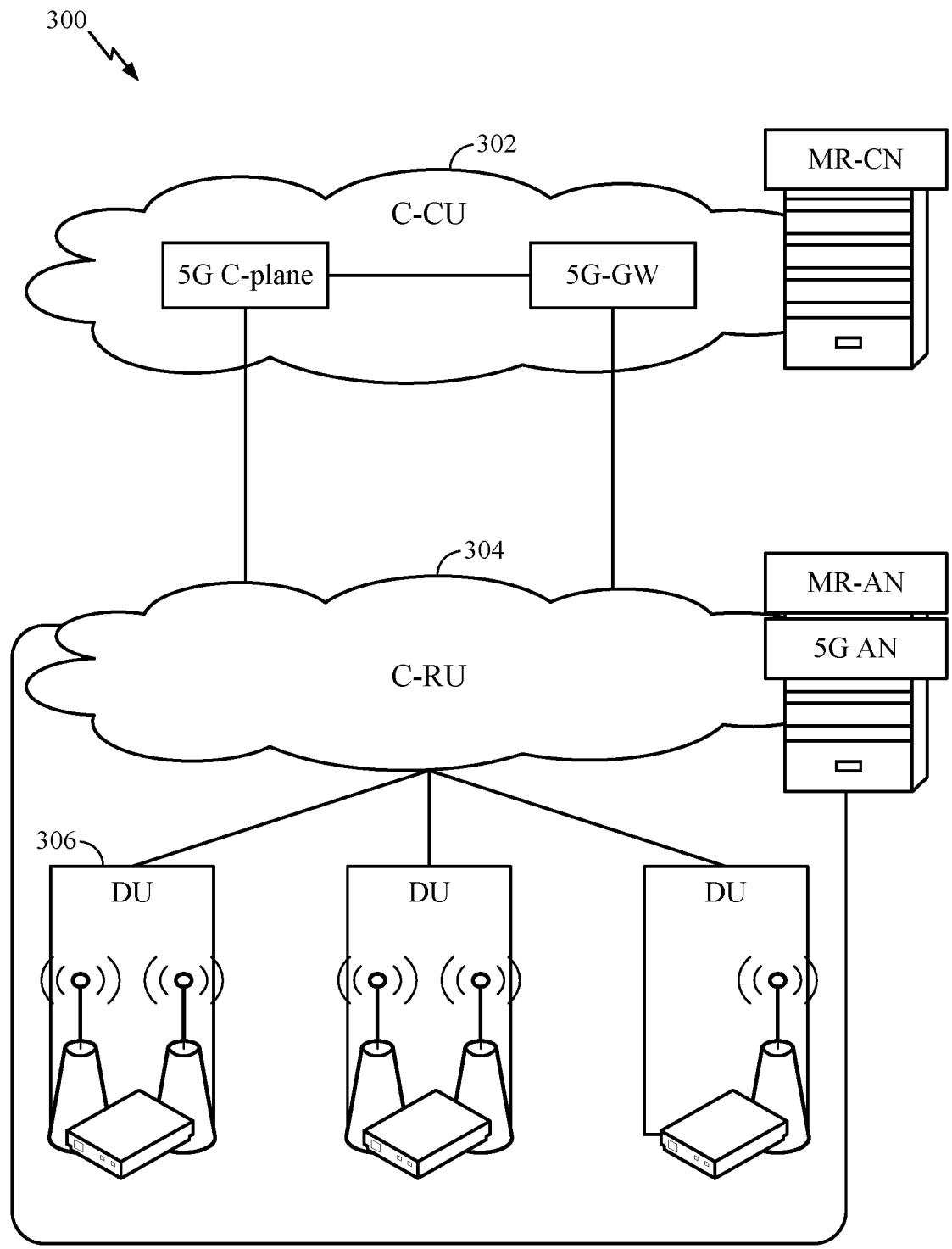
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
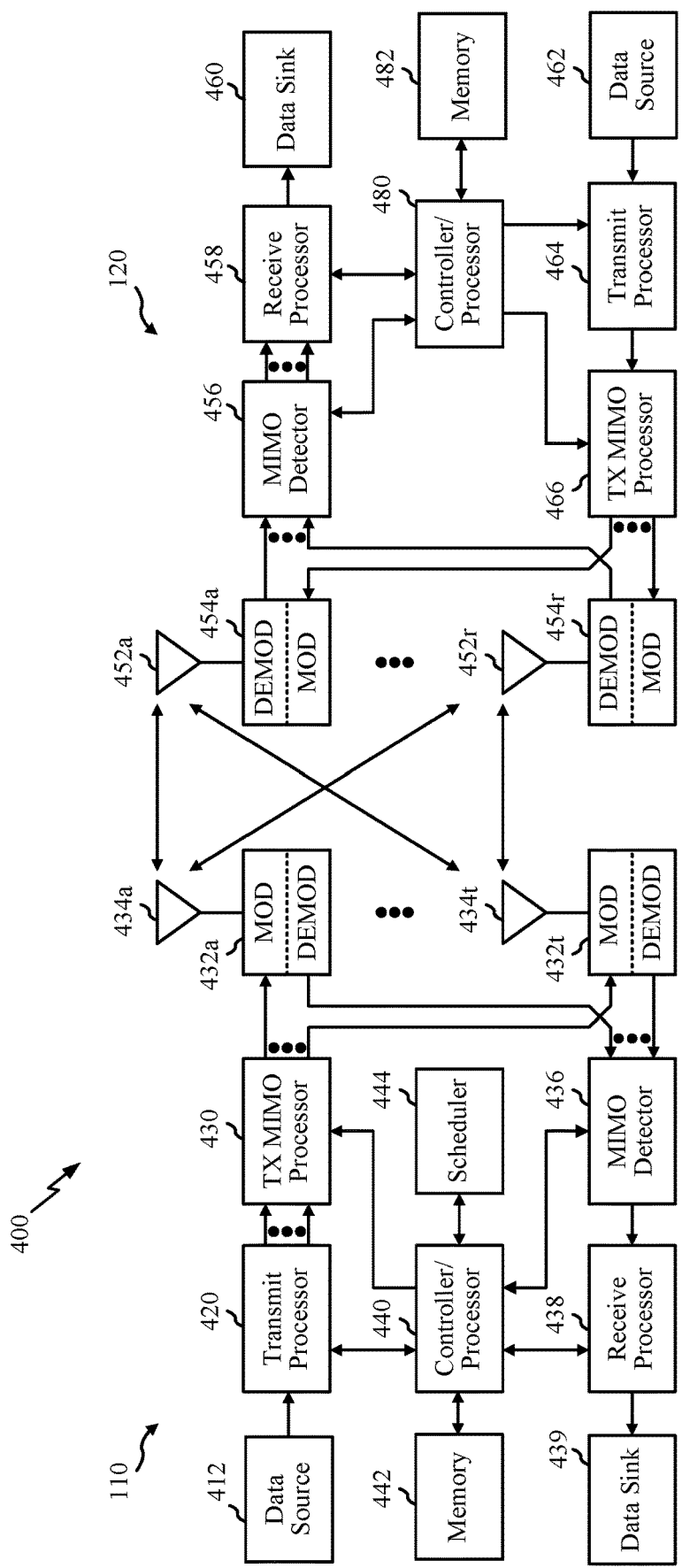
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-10.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIGS. 8 and/or 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
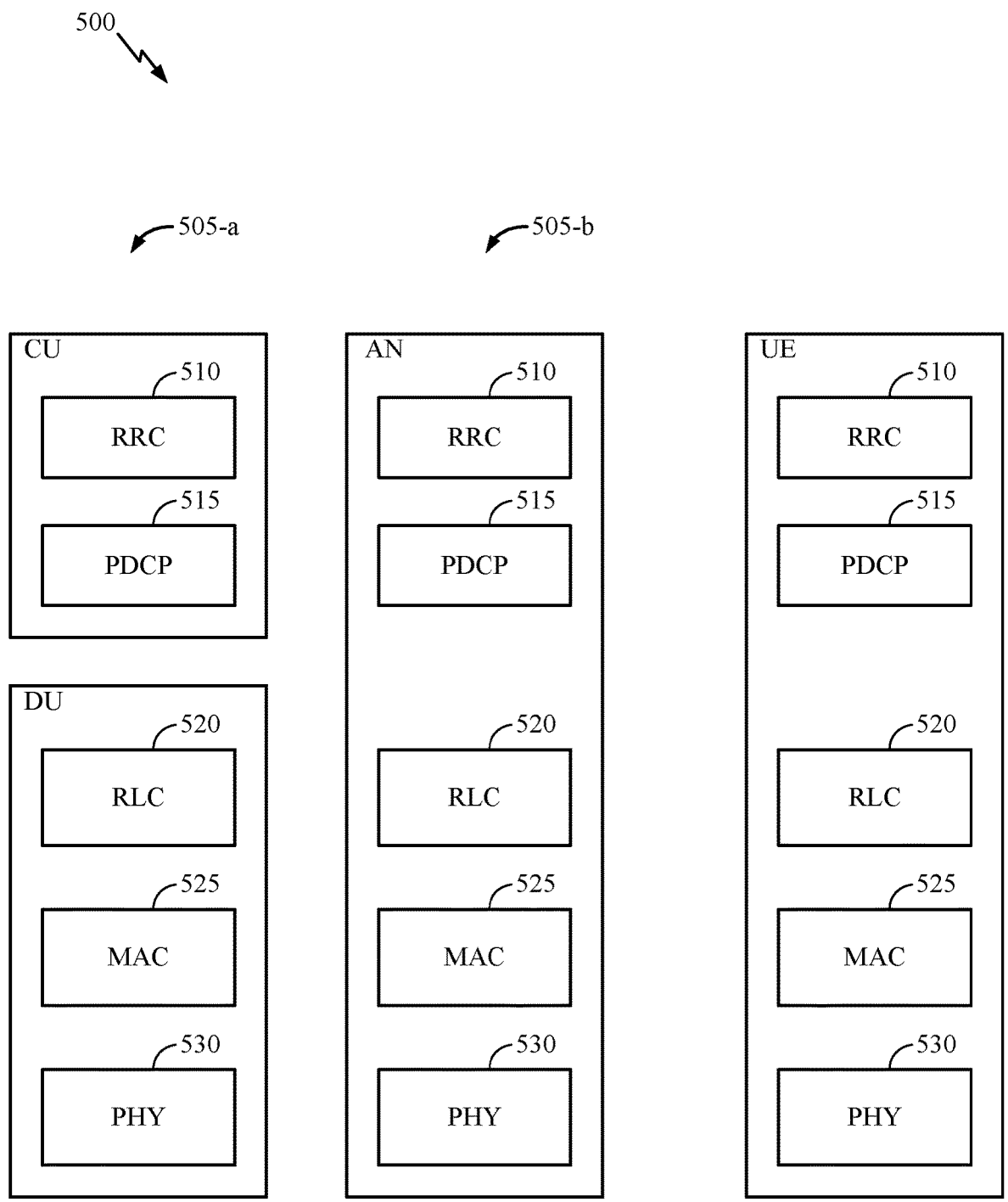
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., TRP/DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
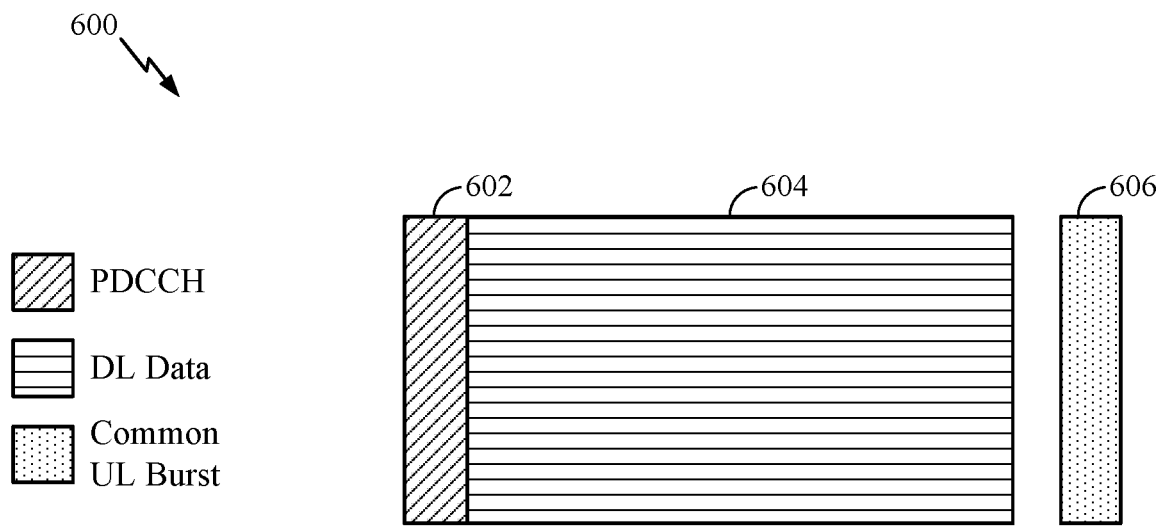
FIG. 6 illustrates an example of a DL-centric subframe, in accordance with certain aspects of the present disclosure.

FIG. 6 is a diagram 600 showing an example of a DL-centric subframe, which may be used to communicate in the wireless network 100. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
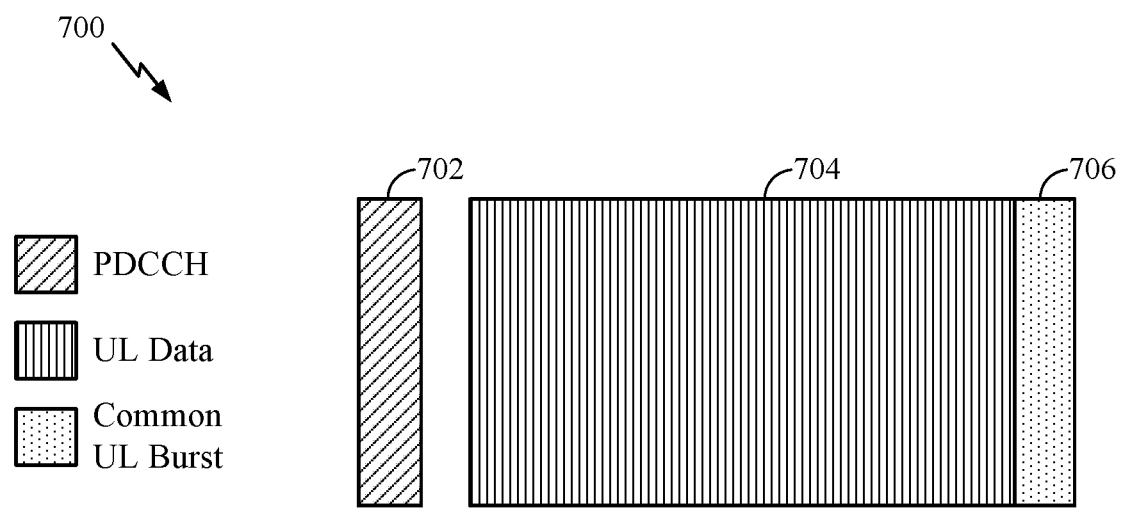
FIG. 7 illustrates an example of an UL-centric subframe, in accordance with certain aspects of the present disclosure.

FIG. 7 is a diagram 700 showing an example of an UL-centric subframe, which may be used to communicate in the wireless network 100. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

EXAMPLE POWER CONTROL AND MANAGEMENT FOR eMBB-URLLC MULTIPLEXING

As noted above, a new air interface is being introduced for 5G, including features that include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and Polar codes.

Wireless standards, such as 5G, may include latency and reliability requirements. Latency in a network may refer to the amount of time required for a packet of data to get from one point in the network to another point in the network. For example, latency in the user plane may be defined based on the time required for a successful delivery of an application layer packet from a layer 2 or 3 medium access control (MAC) service data unit (SDU) ingress point to a layer 2 or 3 MAC SDU egress point through a radio interface. Reliability in a network may refer to a probability of successfully transmitting X number of bytes within 1 ms, where 1 ms is the time to deliver a small packet from a protocol layer 2 or 3 SDU ingress point to an egress point, at a certain channel quality.

URLLC may have tight reliability and latency requirements for both control and data channels. For example, URLLC may have a target block error rate (BLER) of around $10^{-5}$ or lower (e.g., $10^{-9}$) and a target latency of around 0.5 ms (or 1 ms). Due to the stringent requirements for URLLC, a single transmission achieving the required BLER can be very inefficient.

In certain cases, eMBB communication services and URLLC communication services are scheduled at different transmission time intervals (TTIs) to meet respective quality of service (QoS) requirements. However, while scheduled at different TTIs, eMBB and URLLC are multiplexed in the same time-frequency resource to achieve efficient resource utilization.

In certain cases, eMBB traffic and URLLC traffic may be scheduled at the same time. In this case, as eMBB and URLLC are multiplexed in the same time-frequency resources, eMBB traffic (e.g., resource elements) may be "punctured"/pre-empted to accommodate URLLC traffic, for example, since URLLC traffic (e.g., rank 1 traffic) takes priority over eMBB traffic (e.g., rank 4 traffic).

Figure 8:
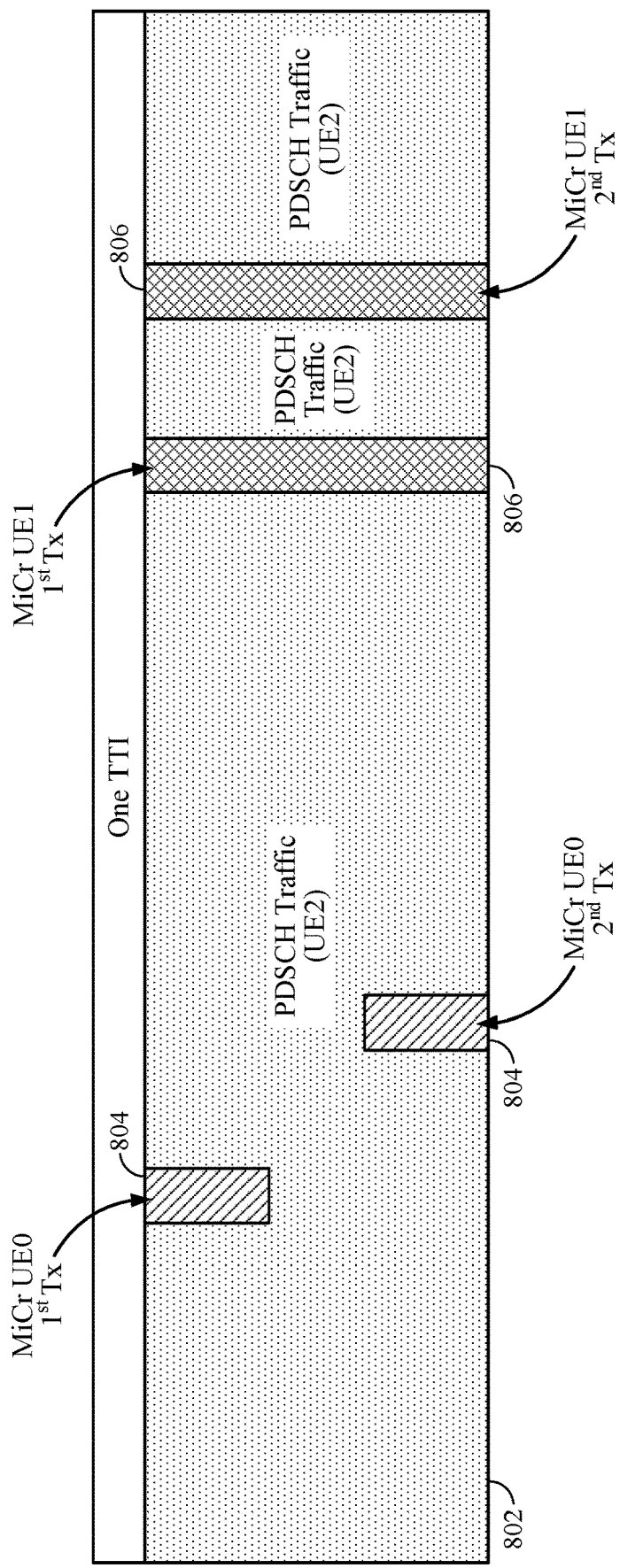
FIG. 8 illustrates an example TTI in which eMBB traffic and URLLC traffic dynamically sharing the same time-frequency resources, in accordance with certain aspects of the present disclosure.

FIG. 8 illustrates an example TTI in which eMBB traffic and URLLC traffic dynamically sharing the same time-frequency resources. For example, as illustrated, during the span of one TTI, a base station may schedule eMBB traffic 802 (e.g., PDSCH traffic) and URLLC traffic 804 and 806 (e.g., mission critical (MiCR) traffic) using the same time-frequency resources. Additionally, as illustrated, since eMBB traffic 802 and URLLC traffic 804 and 806 share the time-frequency resources and since URLLC traffic takes priority over eMBB traffic, eMBB resource elements (e.g., of the eMBB traffic 802) may be punctured/pre-empted to accommodate the URLLC traffic 804 and 806.

One problem with the puncturing scheme discussed above, however, is that this puncturing removes the resources allocated to the eMBB UE2 completely (e.g., on all MIMO layers). For example, to support a rank-1 MiCr UE that transmits URLLC traffic in the presence of eMBB rank-4 transmission (e.g., eMBB traffic), all of the eMBB traffic scheduled at the same time as the URLLC traffic may have to be punctured, which may be wasteful. Alternatively, taking away (e.g., puncturing) two layers (e.g., of four MIMO layers allowed for transmission) from eMBB traffic may be sufficient to support URLLC traffic, as described in greater detail below.

An alternative approach to support both eMBB traffic and URLLC traffic without wasting resources may be to superpose another MIMO layer on top of existing MIMO layers in the DL. However, this may create additional interference. Layered modulation may also be possible, which may involve overlaying additional enhancement layer bits on top of base layer eMBB bits in the DL. Additionally, it may be possible to have eMBB data/traffic may overlap URLLC traffic in the UL using non-orthogonal multiple access technology. However, these approaches may have issues associated with them. For example, if an eNB or UE is already transmitting at a maximum transmission power, then there is no additional power available to transmit the superposed signal (i.e., superposed MIMO layer). Moreover, power control/management may be required to enable superposition and also enhance the puncturing scheme.

Accordingly, aspects of the present disclosure provide techniques for enabling transmission of eMBB traffic and URLLC traffic without the drawbacks associated with the puncturing scheme noted above. For example, techniques presented herein propose a concept of power sharing between eMBB traffic and URLLC traffic.

Figure 9:
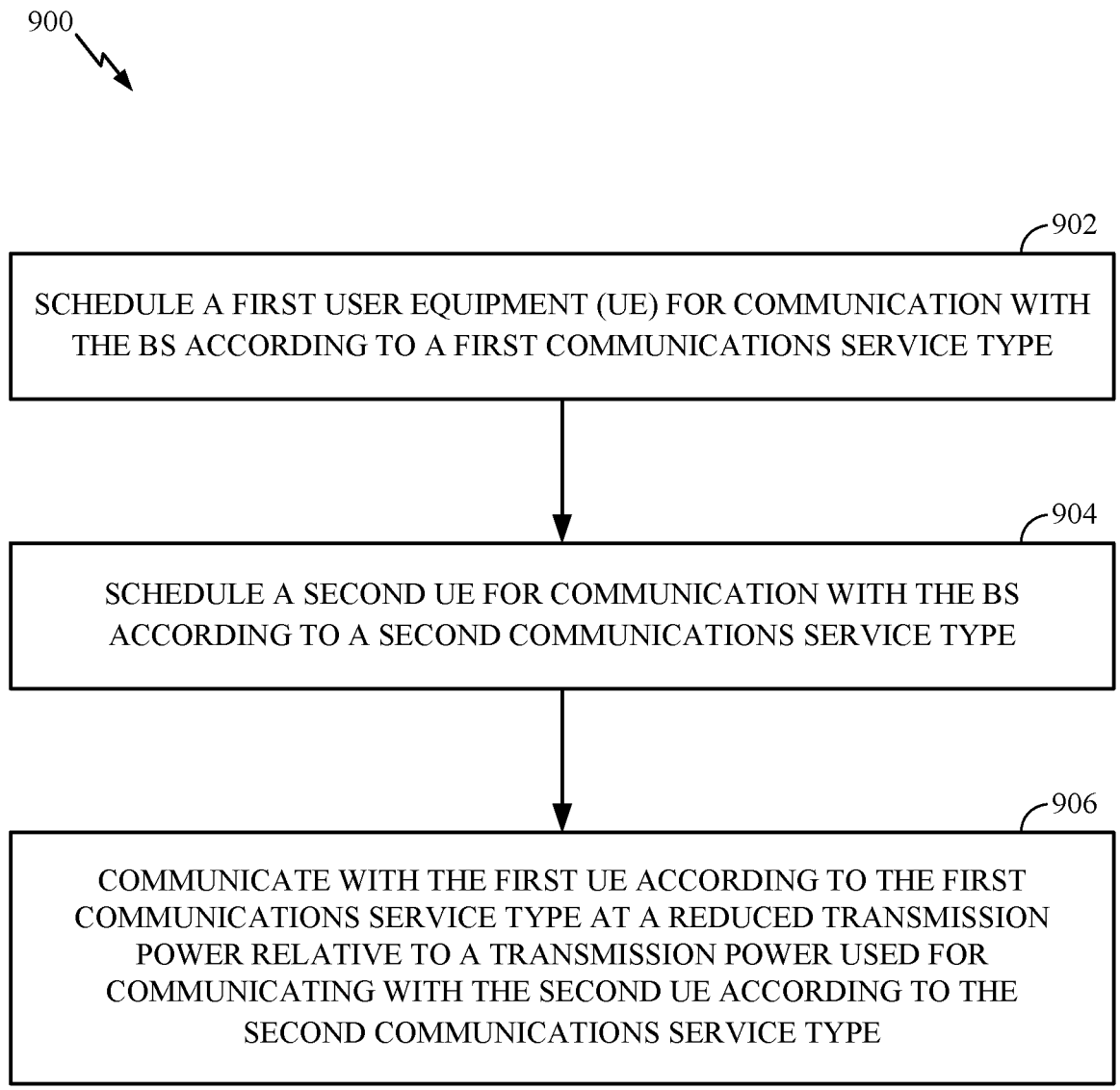
FIG. 9 illustrates example operations performed, by a base station (BS), for wireless communications, in accordance with certain aspects of the present disclosure.

FIG. 9 illustrates example operations 900 for wireless communications. According to certain aspects, operations 900 may help alleviate issues associated with transmitting eMBB traffic and URLLC traffic on the same time-frequency resources, for example, by using the concept of power sharing between eMBB traffic and URLLC traffic.

According to certain aspects, operations 900 may be performed, for example, by a base station (e.g., BS 110). According to certain aspects, the base station may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein.

Operations 900 begin at 902 by scheduling a first user equipment (UE) for communication with the BS according to a first communications service type. At 904, the base station schedules a second UE for communication with the BS according to a second communications service type. At 906, the base station communicates with the first UE according to the first communications service type at a reduced transmission power relative to a transmission power used for communicating with the second UE according to the second communications service type.

Figure 10:
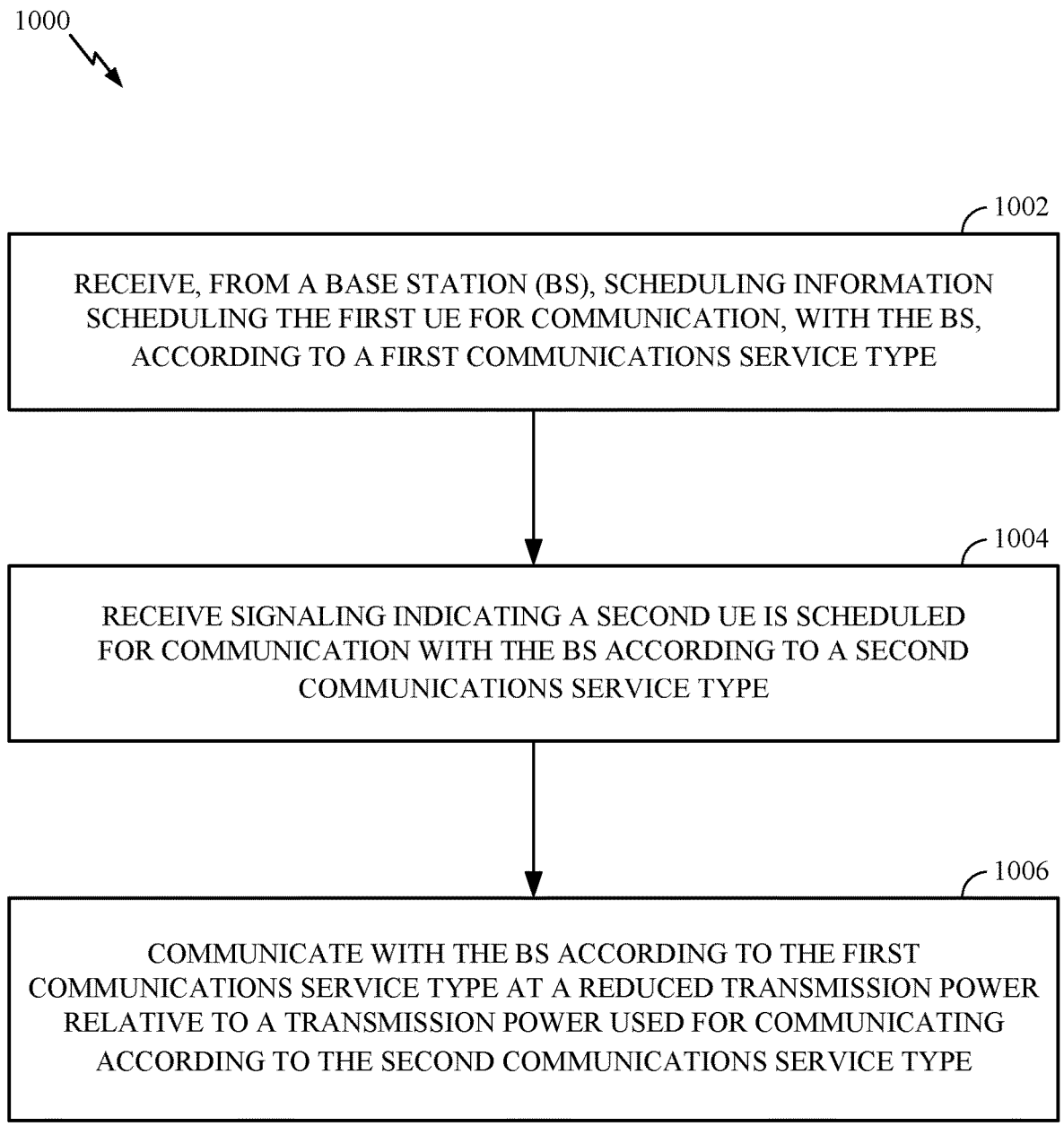
FIG. 10 illustrates example operations performed, by a user equipment (UE), for wireless communications, in accordance with certain aspects of the present disclosure.

FIG. 10 illustrates example operations 1000 for wireless communications. According to certain aspects, operations 900 may help alleviate issues associated with transmitting eMBB traffic and URLLC traffic on the same time-frequency resources, for example, by using the concept of power sharing between eMBB traffic and URLLC traffic.

According to certain aspects, operations 1000 may be performed, for example, by a user equipment (e.g., UE 120). According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 1000 begin at 1002 by receiving, from a base station (BS), scheduling information scheduling the first UE for communication, with the BS, according to a first communications service type. At 1004, the UE receives signaling indicating a second UE is scheduled for communication with the BS according to a second communications service type. At 1006, the UE communicates with the BS according to the first communications service type at a reduced transmission power relative to a transmission power used for communicating according to the second communications service type.

As noted above, techniques presented herein propose a concept of power sharing between an eMBB communications service type and a URLLC communications service type. According to certain aspects, power sharing between eMBB traffic and URLLC traffic may involve transmitting eMBB traffic at a reduced transmission power (e.g., according to a power backoff value for eMBB determined by the BS) relative to a transmission power used for URLLC traffic, which results in excess power that may be used when communicating using URLLC.

For example, a base station may schedule a first UE for communication with the BS according to a first communications service type (e.g., eMBB) and may also schedule a second UE for communication with the BS according to a second communications service type (e.g., URLLC). In certain cases, both eMBB traffic and URLLC traffic may be scheduled at the same time using the same time-frequency resources. In this case, the base station may determine a power backoff value to be used for communication using the eMBB communication service type (e.g., during a same time when communicating using the URLLC communication service type). The power backoff value may indicate a reduction in transmission power that should be used when transmitting eMBB traffic/data. The base station may then communicate with the first UE using eMBB at a reduced transmission power while also communicating with the second UE using URLLC, for example, using the excess power not used for eMBB. In other words, the BS may share power between eMBB and URLLC such that traffic associated with both communication service types may be transmitted at the same time.

According to certain aspects, in some cases, the BS may transmit scheduling information to the first UE and the second UE indicating when they are scheduled to receive or perform transmissions. For example, the BS may transmit scheduling information to the first UE, indicating when the first UE is to receive an eMBB transmission or is to transmit an eMBB transmission. Additionally, the BS may transmit scheduling information to the second UE, indicating when the second UE is to receive an URLLC transmission or is to transmit a URLLC transmission. Further, the BS may also transmit information to the first BS indicating when a URLLC transmission is to occur, for example, to enable the first UE to use the power backoff value determined by the BS to reduce its transmission power, as explained in greater detail below.

According to certain aspects, the power sharing between eMBB and URLLC may be semi-statically or dynamically configured. For example, for semi-static power sharing, eMBB users (e.g., eMBB UEs) may be semi-statically configured with the backoff power value which may apply to both UL and DL. For example, a base station may determine an appropriate power backoff value for eMBB and may transmit signaling to the eMBB UE indicating the power backoff value with information that semi-statically configures the UE to use the power backoff value. In some cases, this signaling may be transmitted to the UE via a radio resource control (RRC) message or in downlink control information (DCI). According to certain aspects, when semi-static power sharing is used, the base station may not need to transmit a new power backoff value for each URLLC transmission (e.g., unlike dynamic power sharing). Instead, the base station may configure the UE with a power backoff value for an extended period of time and may notify the UE when to use the power backoff value (e.g., indicating when URLLC transmissions are scheduled).

After configuring the eMBB UE with the power backoff value, the BS may transmit further signaling (e.g., scheduling information) to the eMBB UE indicating when to use the power backoff value to reduce its transmission power. For example, the BS may indicate to the eMBB UE when there will be a URLLC transmission to enable the eMBB UE to reduce its transmission power while communicating with the BS using the same time-frequency resources as used by the URLLC transmission.

According to certain aspects, under this scheme (i.e., semi-static power sharing), superposition may be used, for example, by superposing an additional MU-MIMO layer on top of existing layers and also using layered modulation, as described above. Additionally, less resources may be used but at a boosted power (e.g., puncturing less eMBB resources) to transmit URLLC traffic. Further, the power backoff value under this scheme could be applied on a per-layer (e.g., on specific layers) or per codeword basis to achieve more flexibility when performing power sharing.

As noted above, the power sharing between eMBB and URLLC may also be dynamic, where eMBB UEs change their transmission power level dynamically per MiCr short TTI on both the UL and DL. Under dynamic power sharing, the BS may transmit signaling indicating a new power backoff value on a per MiCr short TTI (e.g., URLLC transmission) basis. In some cases, this signaling may indicate both the power backoff value and when to use the power backoff value (e.g., when a URLLC is scheduled). The UE (e.g., an eMBB UE) may receive the power backoff value (e.g., on an indicator channel) and reduce its transmission power accordingly while communicating with the BS using the same time-frequency resources as used by the URLLC transmission.

According to certain aspects, the eMBB UE may need to monitor the indicator channel (e.g., which signals the power backoff value) to adjust its demodulation assumption (e.g., constellation) in order to correctly transmit and receive eMBB data. Further, on the UL, the eMBB UE may need to monitor the indicator channel to be able to transmit both eMBB and URLLC data at the desired power levels. For example, if the UE has both eMBB data and URLLC data to transmit (e.g., using the same time-frequency resources), the UE may receive the power backoff value and reduce its transmission power for the eMBB data and use the saved transmission power to transmit the URLLC data. Additionally, in some cases, on the DL, the eMBB UE may try to blindly estimate the potential transmission power change.

According to certain aspects, dynamic power sharing information (e.g., a power backoff value and/or information indicating when to use the power backoff value) may be transmitted by the BS in a control/indicator channel per MiCr short TTI, indicating to the UE, for example, the specific MiCr short TTI to apply the eMBB power backoff value to reduce transmission power. In some cases, the dynamic power sharing information may be indicated per MIMO layer and/or per codeword to further minimize the impact on eMBB UEs.

Additionally, dynamic signaling of power sharing information may be transmitted by the BS in a UE-specific message or in a broadcast message and may be applied to an entire bandwidth used for eMBB traffic and URLLC traffic or may apply to different sub-bands of a larger bandwidth used for the eMBB traffic and URLLC traffic. According to certain aspects, if the power sharing information is carried in a UE-specific unicast message, the power sharing information may apply on a per MIMO layer and/or per sub-band basis. Further, if the power sharing information is carried in a broadcast message to a plurality of UEs, the power sharing information may apply on a per antenna port and/or per sub-band basis, for example, indicating which sub-band needs power backoff for a particular antenna port.

Additionally, the power sharing information may comprise an indication informing the UE of puncturing of particular layers (zero power scenario of the per MIMO layer power backoff case), such that the power of these layers could be utilized by for MiCr transmissions (e.g., URLLC transmissions). Additionally, in some cases, the dynamic signaling of the power backoff may also be communicated between eNBs or UEs either via backhaul or OTA signaling to achieve interference management. For example, if a MiCr URLLC transmission is expected to be present in a certain TTI, the dynamic signaling (e.g., including the power sharing information) may be transmitted to and applied by neighbor cell UEs/eNBs, enabling the neighbor cell UEs/eNBs to reduce their transmission power during the MiCR URLLC transmission for interference management purposes.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for scheduling, means for determining, and/or means for estimating may comprise one or more processor, such as the control/processor 240 of the eNB 110 and/or the controller/processor 280 of the user equipment 120. Further, means for communicating, means for transmitting, and/or means for receiving may comprise one or more antennas, such as the antenna 234 of the eNB 110 and/or antenna 252 of the user equipment 120. Additionally, in some cases, communicating, means for transmitting, and/or means for receiving may comprise one or more modulators/demodulators, such as modulator/demodulators 232 and 254.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a first base station (BS), comprising:
   scheduling a first user equipment (UE) for communication with the first BS according to a first communications service type;
   scheduling a second UE for communication with the first BS according to a second communications service type;
   transmitting signaling indicating a power backoff value to at least the first UE for the first communications service type, wherein the signaling includes information indicating only one particular sub-band of a bandwidth used for at least the first communications service type to which the power backoff value applies and only one particular antenna port of a plurality of antenna ports to which the power backoff value applies; and
   communicating with the first UE according to the first communications service type at a transmission power reduced according to the power backoff value, wherein the transmission power is reduced relative to a transmission power used for communicating with the second UE according to the second communications service type.

2. The method of claim 1, further comprising communicating with the second UE according to the second communications service type at a same time as communicating with the first UE according to the first communications service type, wherein communicating with the second UE according to the second communications service type comprises using excess power, resulting from the transmission power reduced according to the power backoff value for the first communications service type, to communicate with the second UE according to the second communications service type.

3. The method of claim 1, wherein the first communications service type and the second communications service type share a same set of time-frequency resources.

4. The method of claim 1, wherein:
   the first communications service type comprises enhanced mobile broadband (eMBB) services; and
   the second communications service type comprises ultra-reliable low latency communications (URLLC) services.

5. The method of claim 1, further comprising receiving data from the first UE at the transmission power reduced according to the power backoff value.

6. The method of claim 1, wherein the signaling further indicates puncturing of certain multiple-input-multiple-output (MIMO) transmission layers.

7. The method of claim 1, wherein the signaling includes an indication of when the first UE should perform transmissions at the transmission power reduced according to the power backoff value.

8. The method of claim 1, wherein the power backoff value is signaled on a per-layer or per-codeword basis.

9. The method of claim 1, wherein the signaling is transmitted in one of a radio resource control (RRC) message or downlink control information (DCI).

10. The method of claim 1, wherein transmitting signaling indicating the power backoff value to the first UE comprises transmitting the signaling dynamically, indicating a new power backoff value to the first UE for the first communications service type on a second communications service type transmission basis.

11. A method for wireless communications by a first user equipment (UE), comprising:
   receiving, from a first base station (BS), scheduling information scheduling the first UE for communication, with the first BS, according to a first communications service type;
   receiving an indication that a second UE is scheduled for communication with the first BS according to a second communications service type;
   receiving signaling of a power backoff value for the first communications service type, wherein the signaling includes information indicating only one particular sub-band of a bandwidth used for at least the first communications service type to which the power backoff value applies and only one particular antenna port of a plurality of antenna ports to which the power backoff value applies; and
   communicating with the first BS according to the first communications service type at a transmission power reduced according to the power backoff value, wherein the transmission power is reduced relative to a transmission power used for communicating according to the second communications service type.

12. The method of claim 11, further comprising communicating with the first BS according to the second communications service type at a same time as communicating with the first BS according to the first communications service type, wherein communicating with the first BS according to the second communications service type comprises using excess power, resulting from the transmission power reduced according to the power backoff value for the first communications service type, to communicate with the first BS according to the second communications service type.

13. The method of claim 11, wherein the first communications service type and the second communications service type share a same set of time-frequency resources.

14. The method of claim 11, wherein:
   the first communications service type comprises enhanced mobile broadband (eMBB) services; and
   the second communications service type comprises ultra-reliable low latency communications (URLLC) services.

15. The method of claim 11, wherein the signaling further indicates puncturing of certain multiple-input-multiple-output (MIMO) transmission layers.

16. The method of claim 11, wherein the signaling includes an indication of when the first UE should perform transmissions at the transmission power reduced according to the power backoff value.

17. The method of claim 11, wherein the signaling of the power backoff value is received in one of a radio resource control (RRC) message or downlink control information (DCI).

18. The method of claim 11, wherein receiving signaling of the power backoff value for the first communications service type comprises receiving the signaling dynamically, indicating a new power backoff value for the first communications service type on a second communications service type transmission basis.

19. An apparatus for wireless communications by a first base station (BS), comprising:
 at least one processor configured to:
  schedule a first user equipment (UE) for communication with the first B S according to a first communications service type;
  schedule a second UE for communication with the first BS according to a second communications service type;
  transmit signaling indicating a power backoff value to at least the first UE for the first communications service type, wherein the signaling includes information indicating only one particular sub-band of a bandwidth used for at least the first communications service type to which the power backoff value applies and only one particular antenna port of a plurality of antenna ports to which the power backoff value applies; and
  communicate with the first UE according to the first communications service type at a transmission power reduced according to the power backoff value, wherein the transmission power is reduced relative to a transmission power used for communicating with the second UE according to the second communications service type; and
 a memory coupled with the at least one processor.

20. An apparatus for wireless communications by a first user equipment (UE), comprising:
 at least one processor configured to:
  receive, from a first base station (BS), scheduling information scheduling the first UE for communication, with the first BS, according to a first communications service type;
  receive signaling indicating a second UE is scheduled for communication with the first BS according to a second communications service type;
  receive signaling of a power backoff value for the first communications service type, wherein the signaling includes information indicating only one particular sub-band of a bandwidth used for at least the first communications service type to which the power backoff value applies and only one particular antenna port of a plurality of antenna ports to which the power backoff value applies; and
  communicate with the first BS according to the first communications service type at a transmission power reduced according to the power backoff value, wherein the transmission power is reduced relative to a transmission power used for communicating according to the second communications service type; and
 a memory coupled with the at least one processor.

* * * * *